United States Patent [19]
MacCready, Jr. et al.

[11] 4,057,280
[45] Nov. 8, 1977

[54] AERODYNAMIC DRAG REDUCTION DEVICES FOR SURFACE VEHICLES

[75] Inventors: Paul B. MacCready, Jr.; Peter B. S. Lissaman, both of Pasadena, Calif.

[73] Assignee: AeroVironment Inc., Pasadena, Calif.

[21] Appl. No.: 629,366

[22] Filed: Nov. 6, 1975

Related U.S. Application Data

[62] Division of Ser. No. 503,290, Sept. 5, 1974, Pat. No. 3,934,922.

[51] Int. Cl.² .............................................. B62D 35/00
[52] U.S. Cl. ..................................... 296/1 S; 105/2 R
[58] Field of Search .................. 296/1 S, 91; 105/2 R, 105/2 A, 2 B; 135/1 A, 5 A; 224/42.1 E

[56] References Cited

U.S. PATENT DOCUMENTS

| | | | |
|---|---|---|---|
| 2,514,695 | 7/1950 | Dempsey | 296/1 S |
| 3,303,615 | 2/1967 | O'Neal | 135/5 A |
| 3,391,502 | 7/1968 | O'Neal | 135/5 A |
| 3,391,503 | 7/1968 | O'Neal | 135/5 A |
| 3,415,566 | 12/1968 | Kerrigan | 296/1 S |
| 3,538,655 | 11/1970 | Frommelt | 135/5 A |
| 3,714,745 | 2/1973 | O'Neal | 135/5 A |
| 3,875,954 | 4/1975 | Frommelt | 135/5 A |
| 3,945,677 | 3/1976 | Servais | 296/91 |

Primary Examiner—Joseph F. Peters
Assistant Examiner—John A. Carroll
Attorney, Agent, or Firm—William W. Haefliger

[57] ABSTRACT

An elongated protrusion extends adjacent and along a truck body corner in enveloping relation therewith, the corner located at the junction between the exterior side and top walls of a truck body, said protrusion having two rearwardly elongated edge portions respectively attached to the body exterior side wall and top wall, the protrusion having a rearwardly elongated mid-portion which is outwardly convex and which protrudes laterally throughout the major length of the protrusion.

3 Claims, 9 Drawing Figures

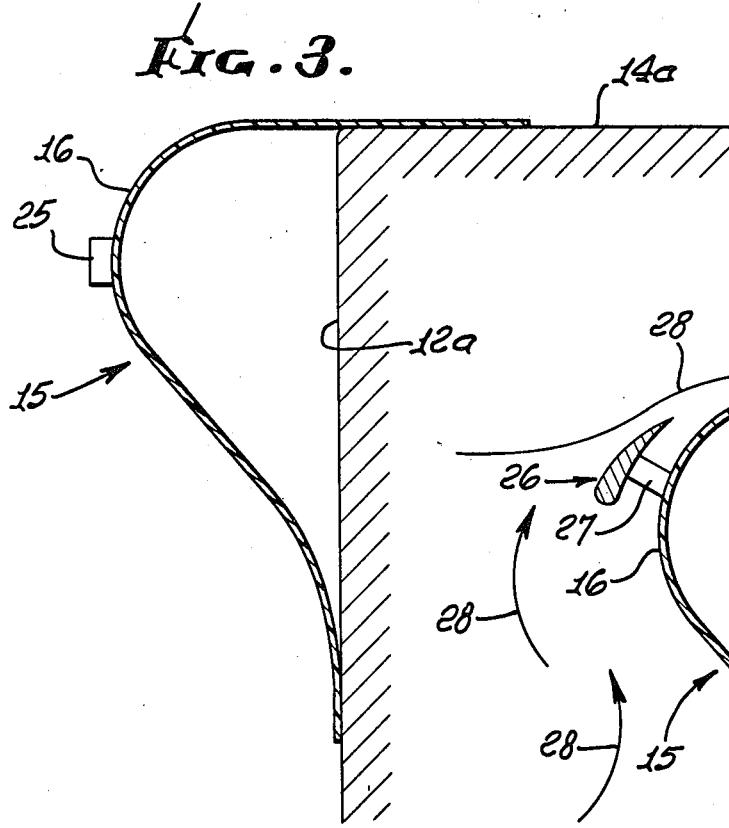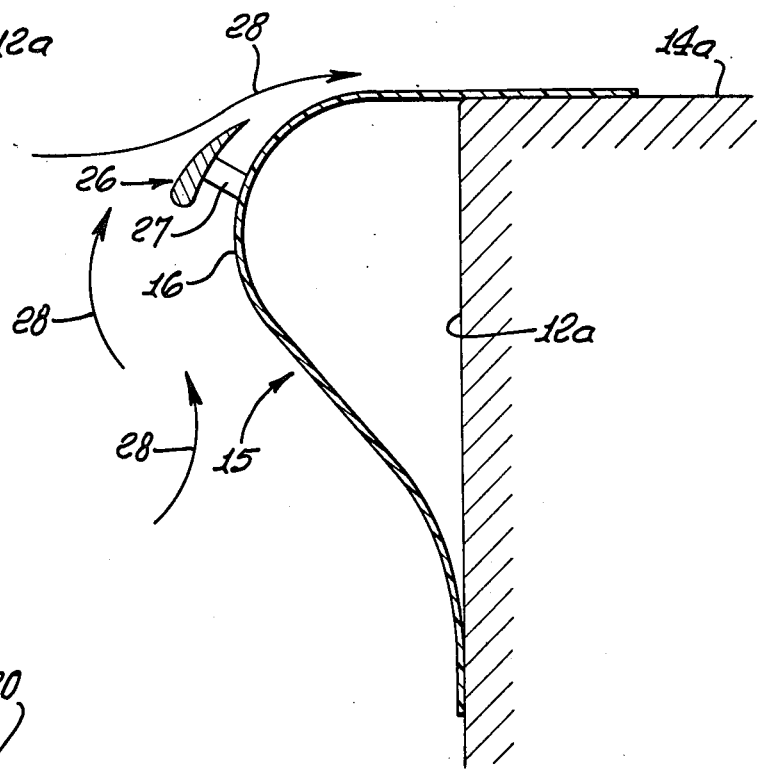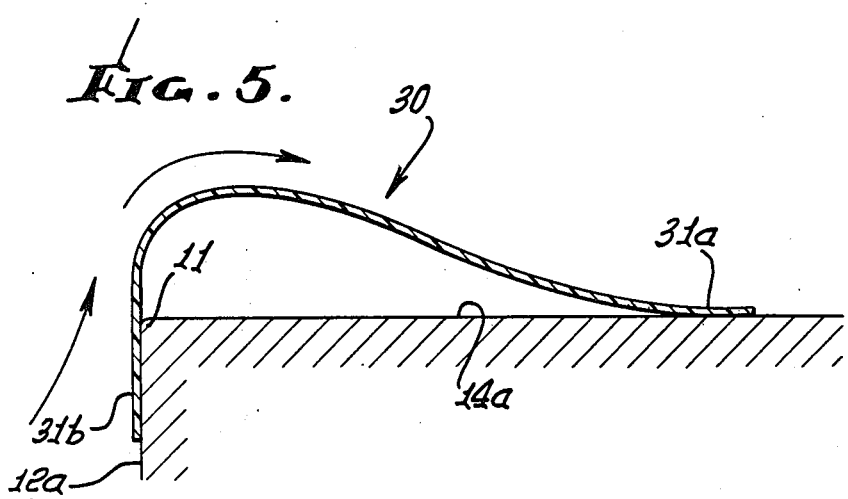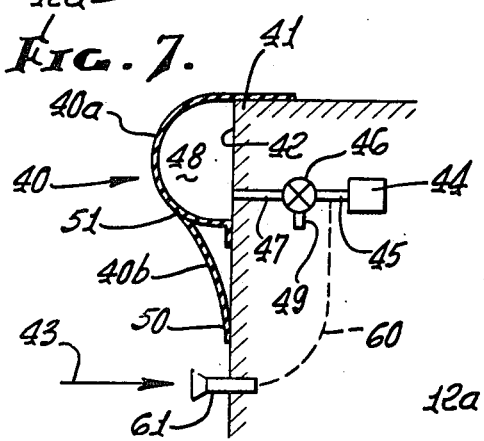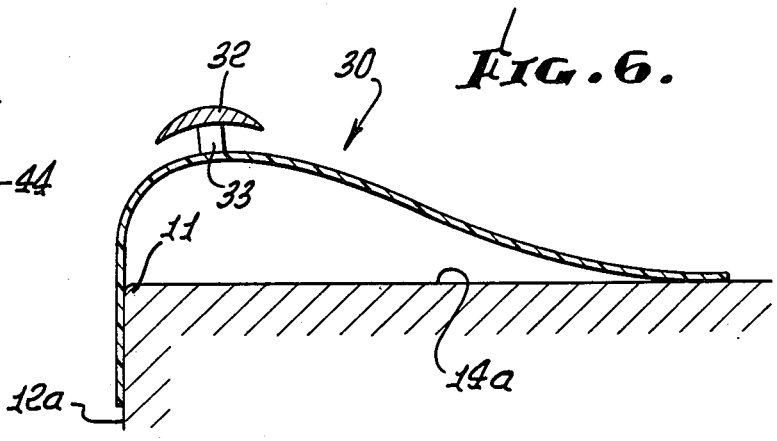

AERODYNAMIC DRAG REDUCTION DEVICES FOR SURFACE VEHICLES

This is a division, of application Ser. No. 503,290, filed Sept. 5, 1974, now Patent No. 3,934,922.

BACKGROUND OF THE INVENTION

This invention relates generally to reducing aerodynamic drag imposed on vehicles such as trucks, trailers, trains, etc., and more particularly concerns the provision of means to prevent, reduce, or delay separation of boundary layer air flow about such vehicles thereby enhancing fuel savings.

Many vehicles (trucks, trailers, trains) are constructed in a box like fashion with sharp 90° corners. This is done both for ease in fabrication and to maximize the number of rectangular crates or other load shapes that can be carried. When such vehicles move, the sharp edges cause the air to separate at the corners and cause the box like body to have high aerodynamic drag, thus requiring more propulsive power. While rounding off such corners can reduce drag, this expedient is undesirable from two points of view; first it reduces the interior storage capacity (frequently by much more than the actual reduction in storage area because of the modular nature of the crates or payload); and secondly, it is often not convenient or possible to modify existing vehicles this way, since much of the structure is in edge framing. Thus, there is a clear need for means which will achieve the effect of a rounded corner without requiring extensive body rework and without reducing interior capacity.

SUMMARY OF THE INVENTION

It is a major object of the invention to provide a solution or solutions to the above difficulties and problems. The invention is particularly adapted for use with a vehicle body having a longitudinally elongated corner from which body surfaces extend at an angle, one of the surfaces presented forwardly toward oncoming relative air flow, and the other surface extending generally rearwardly away from the corner. In this environment, the invention basically comprises:

a. means for preventing, reducing, or delaying separation of the flow boundary layer from said other surface rearwardly of said corner at normal operating speeds of the vehicle, b. said means comprising a longitudinally elongated protrusion having a substantially smooth, arcuate outer surface projecting smoothly outwardly of a first of said body surfaces, said protrusion surface having a first longitudinally elongated terminal extent merging toward said first body surface in spaced relation to said corner, and second longitudinally elongated terminal extent merging toward a second of said body surfaces proximate said corner.

As will appear, the protrusion typically extends outwardly of the first body surface to maximum extent between 2 and 20 inches; it may have generally hook-shaped cross sections particularly when formed as a one-piece thin-walled molded unit; and a vortex generator and/or a flow turning vane may be incorporated with the protrusion as will be seen. Further, the protrusion or protrusions may be incorporated on side walls as well as front facing walls of vehicles, and may be inflatable.

These and other objects and advantages of the invention, as well as the details of illustrative embodiments, will be more fully understood from the following description and drawings, in which:

DRAWING DESCRIPTION

FIG. 3-7 are views like FIG. 2, showing variations.

DETAILED DESCRIPTION

Figure 1:
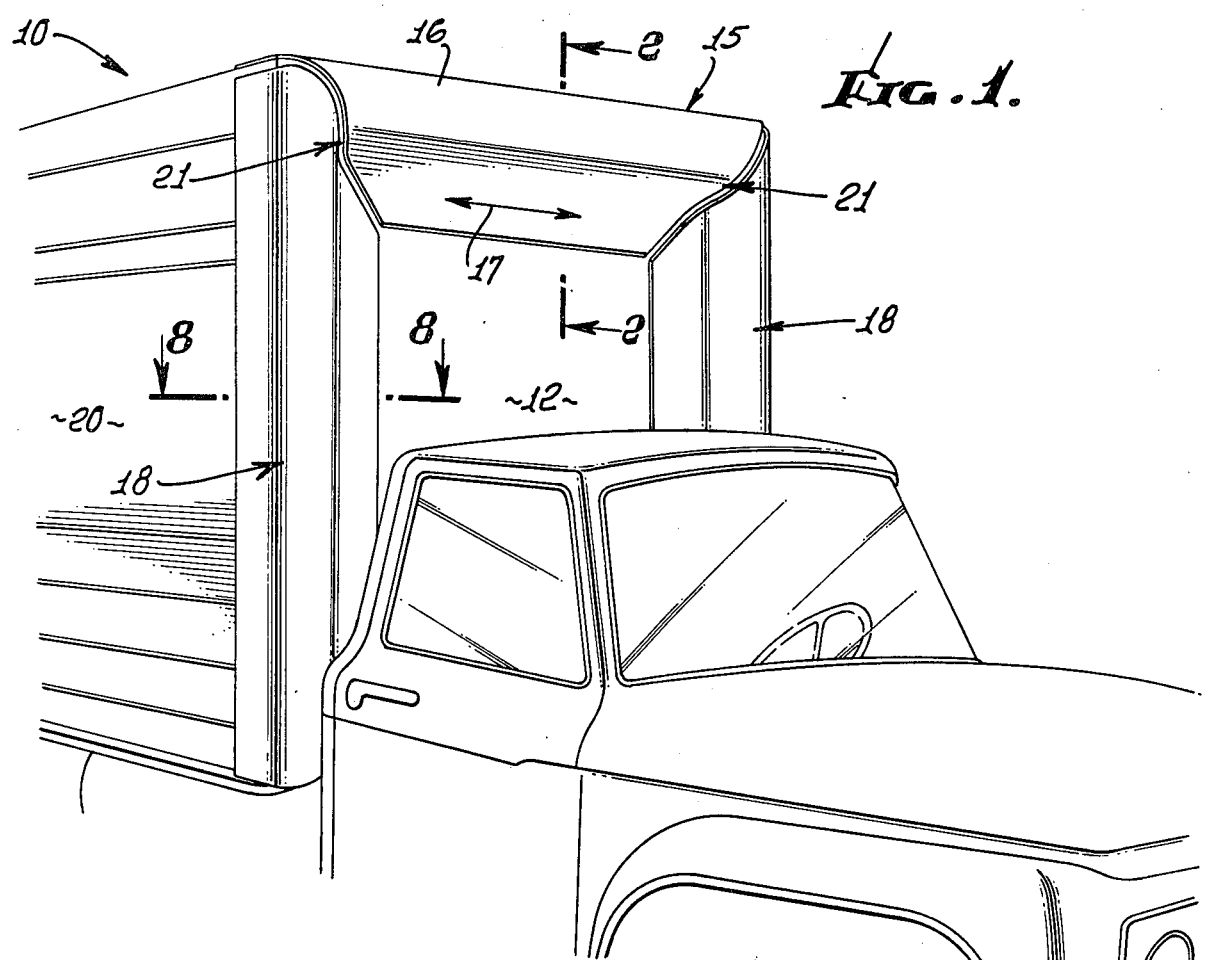
FIG. 1 is a perspective showing an application of the invention.
Figure 2:
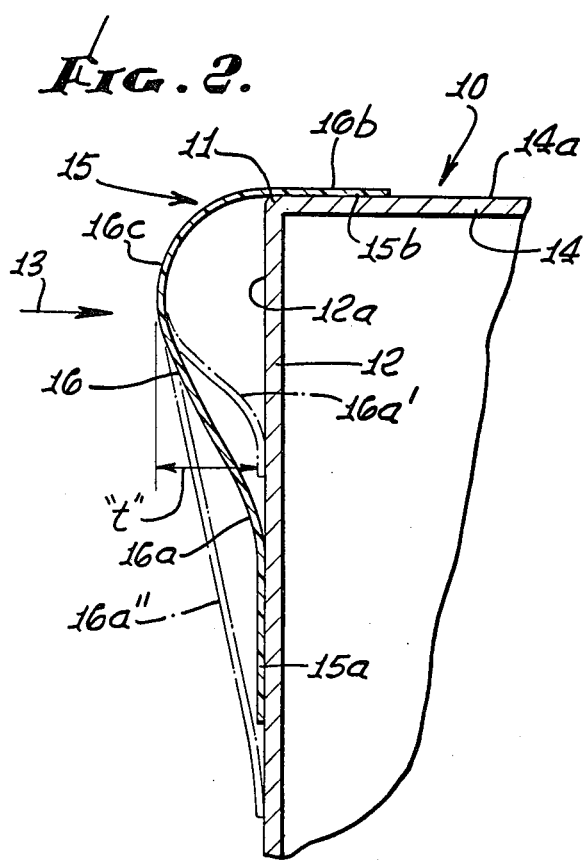
FIG. 2 is an enlarged vertical section taken on lines 2—2 of FIG. 1.

In FIGS. 1 and 2, a vehicle body, as for example a truck trailer body 10, has a longitudinally elongated corner 11 from which body surfaces extend at an angle. One of the surfaces, such as surface 12a of upstanding front wall 12, is presented forwardly toward oncoming relative air flow indicated by arrow 13, and the other surface 14a of horizontal top wall 14 extends generally rearwardly away from corner 11. Surfaces 12a and 14a typically extend at about a 90° angle.

In accordance with the invention, means is provided to prevent or substantially reduce or delay separation of the air flow boundary layer from the other surface 14a rearwardly of the corner 11 at normal operating speeds of the vehicle, as for example about 30 to 60 miles per hour. Such means comprises a longitudinally elongated protrusion 15 having a substantially smooth, arcuate outer surface 16 projecting smoothly outwardly of a first of the body surfaces, such as surface 12a in FIG. 2. The protrusion surface 16 is generally forwardly convex at 16c in planes normal to the longitudinal direction indicated by arrows 17 in FIG. 1; surface 16 has a first longitudinally elongated terminal extent 16a merging toward the first surface 12a in spaced relation to the corner 11; and surface 16 has a second longitudinally elongated terminal extent 16b merging toward the second 14a of the body surfaces, proximate the corner. The protrusion 15 may be molded of reinforced thin-walled plastic material, such as glass fibers and resin, and the longitudinal flaps 15a and 15b defining surfaces 16a and 16b may be bonded or otherwise attached to the body surfaces 12a and 14a, as shown. Note the general "hook-shape" of the illustrated thin-walled protrusion. The radius of curvature of the protrusion surface at 16 must exceed the thickness of the local air flow boundary layer that exists at walls 12 and 14 before the addition of the protrusion; and one may determine, by design or testing, the protrusion shape that results in the least boundary layer separation over the normal vehicle operating speed range. For best results, the maximum projection "t" of the protrusion from the wall should be between 2 and 20 inches. Other possible shapes of surface 16a are shown at 16a' and 16a".

Figure 8:
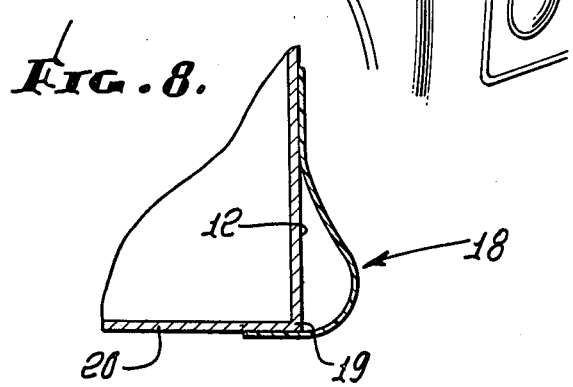
FIG. 8 is a section on lines 8—8 of FIG. 1.
Figure 9:
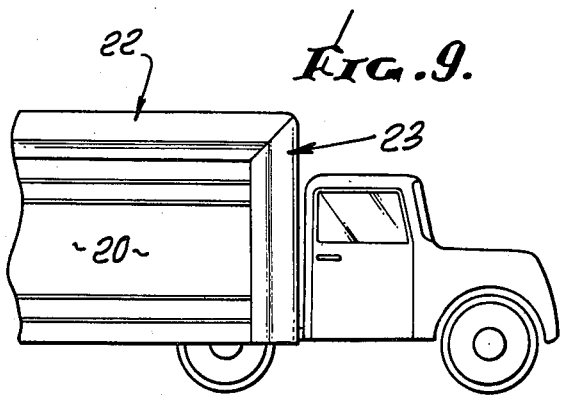
FIG. 9 is a fragmentary side elevation showing the side wall of a trailer body incorporating the invention.

Similar protrusion 18 may be located adjacent the upright corners or edges 19 defined by the vehicle body front wall 12 and upright side walls 20, as seen in FIGS. 1 and 8. All of such protrusions contribute substantially to reductions in drag otherwise induced by air flow past the sharp corners 11 and 19, and consequently fuel savings result. Note the diagonal interfitting of the protrusions 15 and 18 at loci 21. The FIG. 9 modification shows similar horizontal and vertical protrusions 22 and 23 extending along the top horizontal and front and rear vertical edges of the truck or vehicle body side wall 20. This construction reduces the side thrust exerted on the body by sideward wind gusts, and thereby reducing steering difficulties in gusty locations.

FIG. 3 shows the addition of a vortex generator 25 projecting forwardly from, or outstanding from the nose of the protrusion 15. The generator may have wedge or wing shape; it causes an exchange of momentum across the boundary layer that forms on the protrusion, and tends to keep the flow further downstream from separating. Such generators may be spaced along the longitudinal extent of the protrusions. FIG. 4 illustrates the addition of flow turning or deflection vane 26 spaced outwardly of the nose of the protrusions, the vane extending chordwise generally parallel to the surface of the protrusion which it overlies. A strut 27 connects the vane to the protrusion. The vane also aids in keeping the flow further downstream from separating. Note flow arrows 28.

In that form of the invention seen in FIG. 5, the modified protrusion 30 projects outwardly from body surface 14a rather than from surface 12a presented toward the oncoming flow. In this case, the first terminal extent 31a of the protrusion surface 31 merges toward the other body surface 14a in remotely spaced relation to corner 11, and the second terminal extent 31b of the protrusion merges toward the one body surface 12a proximate the corner 11. FIG. 6 shows a modified form of the FIG. 5 design, with a vane 32 mounted to the nose of the protrusion 30, as by a strut 33. Vanes 26 and 32 may be longitudinally elongated, i.e. extend lengthwise of the protrusion noses. Vane 32 also extends chordwise generally parallel to that portion of the protrusion surface which it overlies.

In FIG. 7, an inflated section 40a of a protrusion 40 is located adjacent corner or edge 41 which is elongated in a direction normal to the plane of that view. In uninflated condition, that section may collapse close to or flatly adjacent the surface of body wall 42 presented toward oncoming air flow as indicated by arrow 43. At the option of the vehicle operator, an inflating means, may be operated to inflate the protrusion to the position shown. One such means may include a gas pressure source 44 connected via piping 45, valve 46 and piping 47 with the interior 48 of the protrusion. Valve may have three positions, one in which only the source 44 communicates with the space 48, another in which the pipe 47 is closed-off to prevent escape of gas from space 48, and a third in which gas is released from space 48 to outlet 49. A flexible web section 40b of the protrusion is attached to the body wall 42 at 50, and at 51 to the protrusion section 40a, to be stretched into the position shown upon inflation of section 40a. Section 40a and 40b may consist of rubber or plastic. Accordingly, the operator may or may not use the drag reduction means, at this option.

An alternate source of inflation pressure is shown at 60, and comprises a duct 61 with an inlet exposed to ram effect of on-coming air, thereby to provide "selfinflation".

In an actual test, a truck such as shown in FIG. 1 was extensively operated with and without protrusions, and gas mileage records were kept. The truck was operated at various speeds under 55 miles per hour, on a predetermined course that required both stop and go city driving conditions as well as expressway driving conditions. After protrusions as at 15 and 18 in FIG. 1, and 22 in FIG. 9, were added, it was found that fuel consumption was reduced by about 17.2%. The protrusions 15 and 18 projected outwardly by an amount t = 8 inches, and the protrusions 22 projected outwardly by an amount t = 5 inches.

The protrusion may alternately consist of a metallic sheet, or other suitable material, and may alternately be solid instead of thin-walled.

It is also contemplated that the protrusions may be removably fastened, as by suitable fasteners to the vehicle body, so as to be capable of removal and storage, or use, whenever desired.

We claim:
1. In combination with a truck that includes a cab having a roof, and a box-like body elongated rearwardly of the cab, the body having an exterior front wall facing forwardly toward the cab, said front wall extending downwardly substantially below the level of the cab roof, the body also having laterally opposite exterior side walls, and an exterior top wall, each side wall meeting said top wall at a rearwardly elongated corner, the improvement that comprises,
   a. an elongated protrusion extending adjacent and along one of said corners in enveloping relation therewith, said protrusion having two rearwardly elongated edge portions respectively attached to said body exterior side wall and top wall, said protrusion having a rearwardly elongated mid-portion which is outwardly convex and which protrudes laterally throughout the major length of the protrusion.

2. The combination of claim 1 wherein said front wall meets said side wall at a vertical corner, and including a second protrusion enveloping said vertical corner and extending vertically to mate with said rearwardly elongated protrusion, said second portrusion being convex outwardly of said side wall.

3. The combination of claim 1 wherein said protrusion has a hook-shaped cross section in a vertical lateral plane.

* * * * *